INVENTORS
SEIYA OTANI, TAKAO IWAMURA,
TORU YAMAZAKI, YOSHIO NOGUCHI
and TAKEAKI AKATSUKA BY Paul & Paul
ATTORNEYS.

United States Patent Office 3,586,728
Patented June 22, 1971

3,586,728
PROCESS FOR THE PREPARATION OF HIGH PURITY CYCLOHEXANE
Seiya Otani, Tokyo, Takao Iwamura, Otsu-shi, Toru Yamazaki and Yoshio Noguchi, Tokyo, and Takeaki Akatsuka, Otsu-shi, Japan, assignors to Toray Industries, Inc., Tokyo, Japan
Filed June 11, 1969, Ser. No. 832,389
Claims priority, application Japan, June 21, 1968, 43/42,549
Int. Cl. C07c 5/10
U.S. Cl. 260—667     4 Claims

ABSTRACT OF THE DISCLOSURE

High purity cyclohexane is produced by hydrogenation of benzene in a plurality of series-connected catalytic reactors wherein benzene, preferably free of impurities, is fed to the first reactor, hydrogenation gas is recycled from the last to the first reactor and, at a point intermediate the first and last reactor, a portion of the partially depleted hydrogenation gas is withdrawn and fresh hydrogenation gas, i.e., a gas having a high hydrogen content, fed to the system. The mole ratio of hydrogen to benzene feed is 3–3.8:1, the volumetric ratio of hydrogenation gas not withdrawn to that which is withdrawn at the depleted hydrogenation gas separator is 6–80:1, and the temperature in the initial catalyst reaction layer is 165–220° C.

FIELD AND BACKGROUND OF THE INVENTION

The present invention relates to a process for the preparation of high purity cyclohexane, especially cyclohexane having a high purity suitable for the preparation of cyclohexanone oxime by photonitrosation, which process comprises hydrogenating benzene in a gaseous phase in the presence of a solid catalyst.

Recently, cyclohexane has become increasingly important as a material for the chemical industry. More particularly it is well known that cyclohexanone oxime, which may be obtained by oxidation or photonitrosation of cyclohexane, has become very important as a starting material for preparing ε-capro-lactam and adipic acid which in turn are starting materials for the production of nylon.

Formerly cyclohexane, contained in a large amount of petroleum of a certain kind, was separated therefrom by careful distillation and fractionation. However, recently, in order to obtain high purity cyclohexane in a large amount, a method of preparing the same by hydrogenation of benzene has come to account for a large proportion of the cyclohexane produced. Especially, as mentioned above, cyclohexane finally intended for the production of a polymer like nylon, in particular that which is to be subjected to photonitrosation, must be extremely pure and impurities therein must be strictly regulated as to both kind and amount. It is an object of the present invention to provide a process for preparing such high purity cyclohexane efficiently and economically.

BRIEF DESCRIPTION OF THE INVENTION

This process comprises feeding benzene to the first column of a reaction system which consists of at least two series-connected columns filled with a solid catalyst for hydrogenation, feeding to the reaction system fresh hydrogenation gas, which is a gas having a high hydrogen content, at some point intermediate the inlet of the first and the outlet of the last column, recycling the remaining unreacted hydrogenation gas, after separating cyclohexane produced at the last column, to the first column, discharging partially depleted hydrogenation gas just upstream of the fresh hydrogenation gas feed. Gas phase hydrogenation is thereby carried out with a hydrogen to benzene mole feed ratio of 3–3.8:1, a circulating gas to discharge gas ratio of 6–80:1 (at the depleted gas separator) and a maximum temperature inside the initial catalyst reaction layer of 165–220° C.

DETAILED DESCRIPTION OF THE INVENTION

This invention may be better understood from the following detailed description taken in conjunction with the drawings wherein FIG. 1 is a schematic illustration of one form of apparatus for carrying out the process of the present invention;

Generally, impurities contained in cyclohexane are mainly n-paraffin, i-paraffin and cycloparaffin such as n-hexane, 2 or 2-methyl pentane, methyl cyclopentane and methyl cyclohexane. The sources of these impurities are:

(A) Impurities contained in the benzene or hydrogenation gas feed which are transferred to the product;
(B) Side reactions in the hydrogenation process.

It is preferable in order to obtain the desired high purity cyclohexane, to use benzene having a purity of above 99.8% produced by a special process and apparatus in order to decrease the impurities mentioned in A. Udex grade benzene is an example of such high purity benzenes. Also preferable is hydrogen gas from which has been removed hydrocarbons having at least 4 carbon atoms and those having boiling points near that of cyclohexane such as to make separation difficult. An example of such hydrogen is reformer off gas cooled to remove high boiling point hydrocarbons. However, the use of such materials will not necessarily result in the production of high purity cyclohexane and unless conditions for preventing the side reactions mentioned in B, above, are selected, the objective of the present invention cannot be achieved. Because the boiling points of impurities contained in cyclohexane are often close to that of cyclohexane, it is very difficult to separate them by such operations as simple distillation. When cyclohexane containing impurities is used in photonitrosation reaction, it is found that tar-like impurities are produced at the light source lamp, which are an obstacle to the reaction. Also the quality of the purified lactam obtained from the impure cyclohexane is remarkably lowered.

In the process of the present invention the production of such by-product impurities is prevented by carrying out the hydrogenation reaction to prepare high purity cyclohexane, with a combination of a specific method and the specific reaction conditions, such that high purity cyclohexane is obtained economically at a high yield.

In the present invention benzene is supplied to the first of at least two series-connected reaction columns filled with a solid catalyst for hydrogenation. Hydrogenation gas, high in hydrogen content, is supplied into the reaction system at a point intermediate the first column inlet and the last column outlet. Hydrogenation gas remaining after the cyclohexane product is separated from the outlet stream of the last column is recycled to the first column inlet. In order to prevent accumulation of non-reactive gas in the system, a part of the circulating hydrogenation gas partially depleted of hydrogen by consumption in the system is discharged just upstream of the fresh hydrogenation gas feed to the reaction system.

Figure 1:
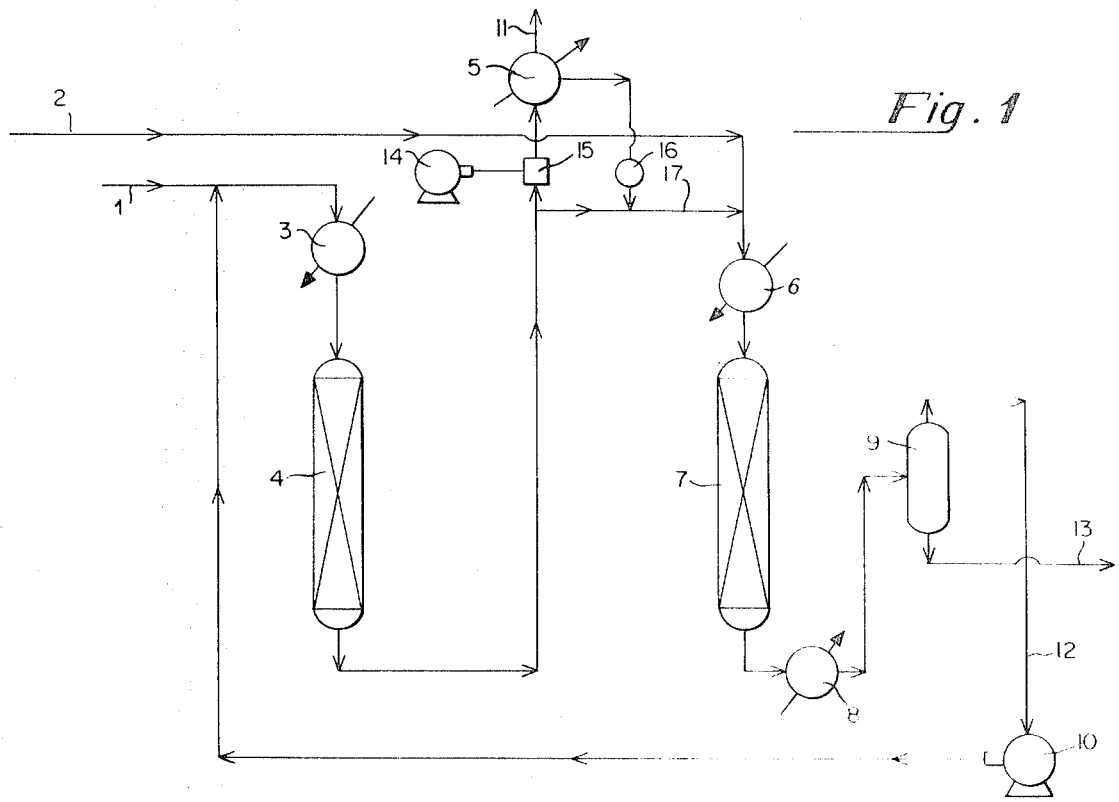

This process may be conducted, for example, in a system such as that schematically illustrated in FIG. 1. In FIG. 1, there is shown benzene feed inlet preheaters 3 and 6 and catalytic bed reactors 4 and 7, and cooler 8 and separator 9 for separating unreacted hydrogenation gas and cyclohexane product. Also shown are cyclohexane product outlet 13, recycle pump 10, and recycle gas line 12. Further there is shown discharge pump 14, liquid-vapor mixer 15, and cooler 5 for depleted hydrogenation gas separation and removal through discharge line 11. A cooler 5 ensures complete removal of depleted hydrogenation gas before the liquid (a combination of benzene and cyclohexane at this point) recovered from separator 16 and cooler 5 is recombined with the circulating hydrogenation gas and liquid mixture in circulation line 17.

Benzene feed from inlet 1, mixed with recycled hydrogenation gas from recycle pump 10, is preheated by preheater 3, and thereafter enters the reactor 4 which is filled with a solid catalyst. In reactor 4 more than about 80% of the benzene is converted to cyclohexane. A part of the mixed gas, now partially depleted of hydrogen by consumption in reactors 4 and 7, from reactor 4 is delivered through mixer 15 and cooler 5, which may consist, for example, of a packed column, to cooler 5 to recover the accompanying cyclohexane and benzene from the depleted hydrogenation gas which is thereafter purged. The remainder of the mixed gas, which comprises the greater part thereof, is mixed with fresh hydrogenation gas from inlet 2. This mixture is then preheated by preheater 6 and forwarded to reactor 7, which is filled with a catalyst, where the unreacted benzene is converted to cyclohexane. Thereafter the cyclohexane product and unreacted hydrogenation gas is cooled by cooler 8 and the latter is separated by separator 9 and circulated by pump 10 and recycle line 12 to preheater 3 and reactor 4. Cyclohexane product from separator 9 is discharged through outlet 13.

In the process of the present invention, as described generally above, the mole feed ratio of hydrogen to benzene, the ratio of circulating hydrogenation gas to the amount of depleted hydrogenation gas discharged from the reaction system, and the temperature of the initial catalyst reaction layer must be maintained within certain predetermined limits. These limits have been established as a result of certain factual discoveries discussed below.

Primarily, it has been found that, independent of the kind of activity of the hydrogenation catalyst, the proportion of side products produced increases with increasing catalyst bed temperature and/or decreasing hydrogen content in the hydrogenation gas.

Figure 2:
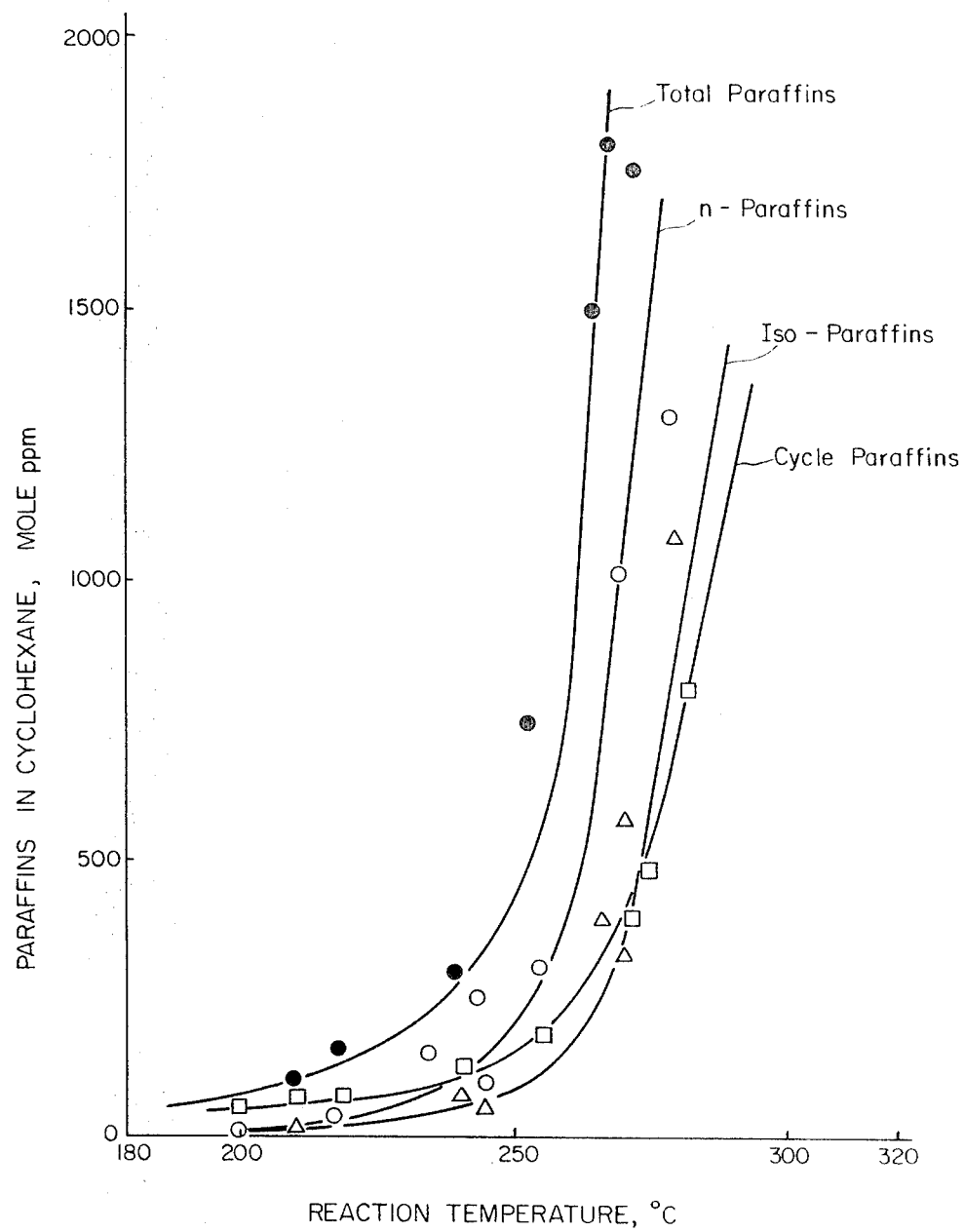
FIG. 2 is a graph showing the relationship of side product reactions as a function of maximum temperature in the catalyst bed.

The catalyst bed temperature dependency of the side product reactions is illustrated in FIG. 2, which indicates that the proportion of side products produced increases significantly as the catalyst bed temperature exceeds 220° C.

This temperature limitation is especially important in the initial stage of the reaction due to the high heat of reaction of the benzene hydrogenation process and the resultant large axial and radial temperature distributions in the reactor. As the highest temperature of this temperature distribution increases, the purity of the cyclohexane product deteriorates due to an increase in the rate of the side reactions. This tendency is independent of hydrogen concentration in the hydrogenation gas.

Figure 3:
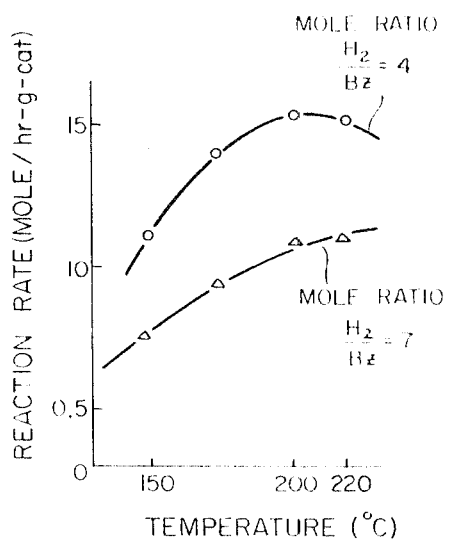
FIG. 3 is a graph showing the catalyst bed temperature to reaction rate relationships for two specific mole feed ratios.

In addition to the foregoing considerations, the relation between the benzene hydrogenation reaction rate and catalyst bed temperature, as shown in FIG. 3, indicates that beyond 220° C. increased temperatures do not greatly increase reaction rate and may in fact cause it to decrease.

Concerning the lower temperature limit, it will be noted that at a temperature lower than 165° C. the reaction rate substantially lowers. Below this temperature, it is found that the volume of the catalyst reaction layer must be unduly large for the economically practical scale of production necessary in industry. The maximum catalyst bed temperature, particularly in the initial catalyst layer where temperature is most critical, should therefore be in the range of 165° to 220° C. Molar ratio of hydrogen to benzene, feed rate per unit weight of catalyst, LHSV, total gas content of system, inlet temperature, ambient temperature, and reaction pressure may also affect product purity indirectly through their effect on catalyst bed temperature and on hydrogen concentration in the hydrogenation gas passing through the catalyst reaction layer. Notwithstanding these indirect effects, and regardless of changes in these factors, when the highest temperature inside the catalyst reaction layer and the concentration of hydrogen in the hydrogenation gas passing therethrough are kept about the same, the quality of the cyclohexane product remains relatively constant.

The concentration of hydrogen in the circulating hydrogenation gas passing through the catalyst reaction layer depends upon the proportion of hydrogenation gas withdrawn or discharged from the system and the hydrogen concentration in the discharged gas. However, it is necessary, mainly for economical reasons, that the concentration of hydrogen in the discharged gas not exceed 30%. The proportion of circulating hydrogenation gas not withdrawn or discharged should be adjusted to effect temperature control inside the catalyst reaction layer, i.e., to prevent it from falling below a certain level, and to maintain the average hydrogen content in hydrogenation gas in the catalyst reaction layers of the system below 40%.

If the hydrogen concentration in the gas discharged from the reaction system exceeds 30%, the effective utilization ratio of hydrogen becomes low. Furthermore, increasing the amount of gas discharged results in loss of undue amounts of benzene and cyclohexane with the gas discharged. This, of course, is not economical.

On the other hand, generally lowering the concentration of hydrogen in the discharged gas results in lowering of the reaction rate and necessitates the use of a large catalyst reaction layer. However, if the hydrogen gas concentration in the hydrogenation gas feed is sufficiently high, hydrogen concentration in the discharged gas may be as low as 30% and still be economically feasible. Summarizing, then, the catalyst reaction layer should be in the range of 165–200° C. and the concentration of hydrogen in the discharged gas should be less than 30% in order to prepare high purity cyclohexane economically.

Figure 4:
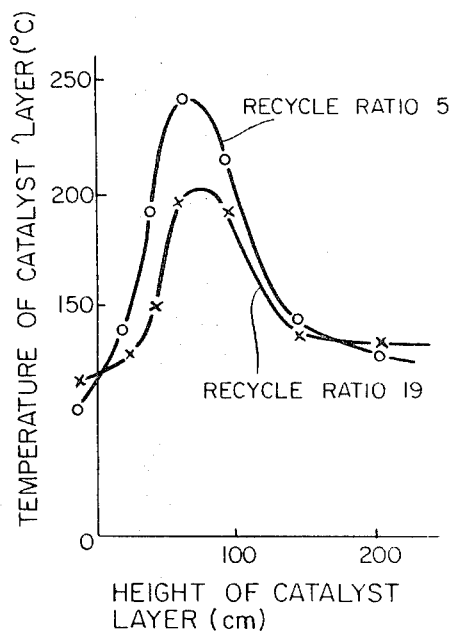
FIG. 4 is a graph showing the catalyst layer height to catalyst bed temperature relationship for two hydrogenation gas circulation to withdrawal ratios.

In FIG. 4 one example of temperature distribution inside the reaction layer when the gas circulation ratio is varied is shown. From FIG. 4, it is seen that at gas circulation ratios of 19 and 5 to 1, there is a considerable temperature peak which, as will be discussed more fully later, causes the production of impurities due to side-reactions to increase.

When the ratio of circulating hydrogenation gas not withdrawn from the system is increased so as to make the gas circulation ratio more than 80, side-reactions are suppressed; however, because pressure loss increases and reaction rate becomes extremely low, so that the net result is to make operation at circulation ratios of more than 80 uneconomical.

Apart from the use of hydrogenation gas with a high hydrogen content, another factor which makes it feasible to discharge hydrogenation gas from the system with a hydrogen content as low as 30% is the mole feed ratio of hydrogen to benzene. This ratio must be within the range 3–3.8:1. When this ratio is less than 3, the amount of hydrogen in the system is insufficient to convert all of the benzene to cyclohexane. When it exceeds 3.8, the concentration of hydrogen in the discharge gas exceeds 30% and this, of course, is uneconomical. That with such a small amount of hydrogen, high purity cyclohexane can be obtained at a high yield is one of the great characteristics of the present invention.

In the present invention it is desirable to control the initial catalyst reaction layer temperature for the reasons discussed above. An effectively way to achieve this result is to make the initial reactor an external heat-exchange type reactor with an external coolant means.

Nickel or platinum catalysts on silica, alumina or diatomaceous earth carriers are effective in the process of the present invention. In the examples discussed below a catalyst comprised of nickel on diatomaceous earth was used.

It is desirable in the process of the present invention that the hydrogenation feed gas have the highest hydrogen concentration possible. However, normally a reformer off gas, also including some lower hydrocarbons, is used. In any event, hydrogen concentration should be no lower than 50% and preferably at least 70%.

In order to control temperature distribution in the catalyst reaction layer, particularly in that part of the reactor system where the initial reaction occurs, an inert material may be dispersed in the catalyst bed to reduce catalytic activity and conduct heat evenly throughout the bed. Moreover, it has been found that this may be done without a significant adverse effect on benzene conversion in the reactor. Up to ⅔ of the effective length of the bed, beginning at a point between the reactor entrance and a point ⅓ the catalyst bed length downstream thereof, may be diluted in this manner. The relative activity of any diluted continuous layer of ⅒ of the effective length of the catalyst layer should be kept at 0.3–0.9.

Relative activity as herein referred to is the ratio of apparent reaction rate of a catalyst of reduced activity to that of a catalyst having normal activity. It should be noted that reactor size is generally chosen so as to contain sufficient catalyst to effect at least 80% benzene conversion.

Catalytic activity may be calculated as follows (for uniformly mixed catalyst and diluent):

Relative activity $$= \frac{\text{Quantity of diluted catalyst per unit volume}}{\text{Quantity of undiluted catelyst per unit volume}}$$

$$= \frac{W}{W + \frac{\rho(1-\epsilon)}{\rho'(1-\epsilon')}W'} = \frac{1}{1 + \frac{\rho(1-\epsilon)}{\rho'(1-\epsilon')}\left(\frac{W'}{W}\right)}$$

Where $\rho$=Density of catalyst particles
$\rho'$=Density of diluting agent
$\epsilon$=Void fraction of catalyst particles
$\epsilon'$=Void fraction of diluting agent
W=Total volume of catalyst particles
W'=Total volume of diluting agents As the diluting agent used herein, any inert solid having a particle size about the same as that of the catalyst particles (normally 1–10 mm.) will do irrespective of its thermal conductivity and specific heat. Raschig rings, veil saddles, porcelain balls, ceramic particles and metal particles (copper, brass and iron) may be used Generally the thermal conductivity of the diluent is of secondary importance because temperature distribution in the catalyst layer is controlled primarily by fluid mixing effects. Accordingly, the diluting agent may be selected on the bases of mechanical strength, price, and fluid flow resistance. The latter is preferably minimized so as to minimize pressure loss.

The foregoing discussion was directed to reduced activity catalyst made by mixing pelletized catalyst (actually catalyst powder on an inert carrier) with diluting agent of about the same dimensions. The difficulty of uniformly mixing these materials, as required, and maintaining this uniformity as the catalyst is added to the reactor may be avoided by uniformly mixing the catalyst powder with the diluting agent powder at a certain ratio and pelletizing the mixture. Thus it is possible to make pellets of controlled catalytic activity.

The relative activity $\phi$ of such pellets may be calculated as follows:

$$\phi = \frac{\text{Apparent reaction rate of the pellets of reduced catalytic activity}}{\text{Apparent reaction rate of ordinary catalyst pellets}}$$

Under normal conditions where effectiveness factor is small:

$$\phi = \sqrt{\frac{W}{W + (\rho/\rho')W'}}$$

$$= \sqrt{\frac{1}{1 + (\rho/\rho')(W'/W)}}$$

Where $\rho$=Density of the catalyst powder
$\rho'$=Density of the diluting agent powder
W=Quantity of catalyst
W'=Quantity of diluting agent The diluting agent used herein is generally a powder of an inert solid having a particle size similar to that of the catalyst powder. Normally, powder of a catalyst carrier such as alumina, clay or diatomaceous earth is used.

The control of the catalytic activity in the present invention to be effective must begin within the first ⅓ of the effective length of the catalyst layer in the first reactor in the system. This effectively controls the hydrogenation rate of fresh benzene feed if the relative activity of a continuous layer of ⅒ of the effective length of the catalyst layer is below 0.9. The length of the controlled activity catalyst layer may be as much as ⅔ of the effective height of the catalyst bed and the relative activity thereof may be as low as 0.3. If a catalyst layer of relative activity lower than 0.3 is used, over-reactivity and heat buildup is likely to be experienced in the following catalyst layer.

If a substantial part of the reduced activity catalyst layer has the minimum relative activity of 0.3 or if more than ⅔ of the effective bed length is occupied by reduced activity catalyst, the overall conversion in the reactor becomes too low to be practical.

The catalytic activity of a catalyst normally decreases in proportion to the amount of benzene treated by said catalyst. However, when control of catalytic activity is carried out, less catalyst is used and the maximum temperature experienced by the catalyst decreases. This enhances catalyst life considerably.

Recovery of cyclohexane product in the process of the present invention from unreacted hydrogenation gas, which generally is at a pressure of 15–100 atmospheres and has a hydrogen concentration of about 1–30%, is enhanced by adding less than 20, and preferably about 5–15, mole percent benzene to the product mixture. Normally cyclohexane freezes at 6.5° C. Therefore, separation of accompanying gas from pure cyclohexane would have to be carried out above that temperature to avoid clogging the equipment with solid cyclohexane. However, an undue amount of cyclohexane vaporizes and is lost with the separated gas at that temperature. The benzene addition reduces the freezing point of benzene to −20° C., where its vapor pressure is 7 mm. mercury. Thus the separation of the gas and the cyclohexane-benzene mixture may be accomplished in the range 0 to −20° C. with only negligible loss of the liquid materials. The exact amount of benzene added and the exact separation temperature are determined by balancing the cost of cooling to the value of additional cyclohexane recovered. Thus high purity cyclohexane is obtained at a high yield.

The foregoing characteristics of the process of the present invention may be summarized as follows:

(A) To the reaction zone where the hydrogenation of benzene is completed fresh hydrogenation gas is supplied to elevate the concentration of hydrogen, thereby completing the reaction in a relatively small catalyst reaction layer.

(B) To the first column to which the fresh benzene feed is supplied, recirculated hydrogenation gas from the final reactor in the system is supplied to limit the hydrogen available for reaction with the fresh benzene feed, thereby limiting temperature rise due to sudden reaction. This inhibits side reactions which produce impurities.

(C) By controlling reactivity in the first column, it is possible to effectively lower the concentration of hydrogen in a gas to be discharged from the reaction system and raise the utilization ratio of hydrogen.

(D) There is no recirculation of cyclohexane, therefore residence time of cyclohexane in the catalyst reaction layer is limited and unnecessary side reactions are prevented.

(E) By the inclusion of benzene, either added from an external source or present as unreacted feed benzene, the freezing point of cyclohexane is lowered and it is possible to cool said gas to a sufficiently low temperature to avoid undue loss thereof with gas separated therefrom.

(F) By maintaining the gas circulation ratio at 6–80 and making the reactor wherein the initial reaction is carried out an external heat-exchange type multi-tube reactor and cooling the reaction bed from outside, it is possible to limit the highest temperature inside the catalyst layer to 165–220° C. and thereby to prepare high purity cyclohexane.

As pointed out above, if the initial reaction is carried out in an adiabatic reactor, and the gas circulation ratio is less than 6, the temperature in the initial catalyst layer may exceed 220° C. and impurities will be produced along with the cyclohexane. If the gas circulation ratio exceeds 80 the pressure drop in the system becomes too large and the reaction rate too small.

(G) The ratio of hydrogen gas to benzene supplied to the system is limited to 3–3.8 moles of pure hydrogen to 1 mole of benzene. This makes it possible to limit the concentration of hydrogen in the gas discharged from the system to below 30%. As a result, utilization ratio of hydrogen is high and the process is economical. When the ratio of hydrogen is outside said range, either hydrogen necessary for the reaction is not supplied or is supplied in excess.

(H) By diluting at a proper ratio a part of the catalyst reaction layer as mentioned above, it is possible to uniformalize the temperature distribution inside the catalyst layer by limiting the reaction and therefore the heat of reaction produced therein. This facilitates temperature control so that the highest temperature is within the range of 165–220° C. So that while it is possible to produce high purity cyclohexane by the process of the present invention without a reduced activity or diluted catalyst layer, it is preferable to do so for the following reasons:

(1) With a given reaction and cooling means therefor, the amount of circulating gas, viz the gas circulation ratio, may be decreased.

(2) The diameter of each reaction tube in a multi-tube reactor may be larger and the number of reaction tubes required may be smaller.

(3) Generally, external cooling of the reaction tube is carried out by generating a low pressure steam. However, if the catalyst is diluted, it is possible to generate a steam of a higher pressure.

Following are some examples of the process of the present invention in which some of the foregoing characteristics are explained and demonstrated.

EXAMPLE 1

Two jacketed reaction columns each having an internal diameter of 5 centimeters (hereafter cm.), and effective catalyst bed lengths of 3 meters were filled with 5 liters of a solid nickel-based hydrogenation catalyst, and were arranged in series as shown in FIG. 1. The temperature was controlled by pressurized water in the column jackets, ten and one half cubic meters (at standard conditions of temperature and pressure) per hour (hereinafter Nm.$^3$/hr.) of hydrogenation gas (hydrogen concentration, 70%, remainder, mainly methane) was supplied at the reaction pressure of 30 kilograms per square centimeter to the second reaction column and 9.0 liters/hour of benzene (purity 99.98%) produced by the Sulfolan method, containing 18 parts per million (hereinafter p.p.m.) of n-paraffin, 30 p.p.m. of methylcyclohexane and 110 p.p.m. of toluene was supplied to the first reaction column. The mole ratio of hydrogen to benzene was thus 3.2:1. A gas circulation ratio of 8 was used and, accordingly, the amount of circulating gas entering the first column was 37 Nm.$^3$/hr. The jacket of the first reaction column was maintained at 90° C. and the highest temperature within the first reaction column was 215° C. The temperature in the second column was maintained at 180° C. The concentration of hydrogen gas in the discharged gas under these conditions was 13%. The conversion inside the first reaction column was 94.5% and at the exit of the second reaction column, no unreacted benzene was detected in the cyclohexane product.

Lower hydrocarbons were separated from the cyclohexane product by distillation and were found to be about the same as the impurities contained in the benzene feed material. Cyclohexane having a purity of 99.93% was thus obtained. When this cyclohexane was used in a photonitrosation reaction with NoCl, cyclohexanone oxime hydrochloride was obtained at a good yield.

EXAMPLE 2

This reaction was carried out as in Example 1 except that reaction pressure was 30 kg./cm.$^2$, the hydrogen gas feed rate was 12.6 Nm.$^3$/hr. and the benzene feed rate was 11.25 liters/hour (molar ratio of $H_2$ to benzene, about 3.1). In this example the gas circulation ratio was 20.0 and the highest temperature inside the first reaction column was 212° C. The quality of the cyclohexane product after distillation was very good and the purity was 99.87%. Hydrogen concentration in the discharged gas was 7.6%.

EXAMPLE 3

Same as Example 1 except benzene feed rate was 16.7 liters/hour, the hydrogen concentration in hydrogenation gas feed was 90%, the feed rate thereof was 14.1 Nm.$^3$/hr. and the molar ratio of hydrogen to benzene was 3.04. Reaction pressure was 30 kg./cm.$^2$ G and the gas circulation ratio was 54. Accordingly, 75.6 Nm.$^3$/hr. of unreacted hydrogenation gas was recycled to the first reactor. The highest temperature inside the first reaction column was 203° C. and the concentration of hydrogen in the discharged was was 10%. In this example, the internal diameter of the reaction column was 4 cm. and the temperature of the jacket was maintained at 140° C. by pressurized water. When the cyclohexane product was distilled to remove low boiling point hydrocarbons, a purity of 99.92% was obtained.

EXAMPLE 4

Same as Example 1, except benzene feed rate was 4 liters/hour, hydrogenation gas (with hydrogen concentration of 55%) feed rate was 6.9 Nm.$^3$/hr. (molar ratio of $H_2$ to benzene, 3.77), reaction pressure was 20 kg./cm.$^2$, and gas circulation ratio was 15. In this example, the highest temperature inside the first reaction column reached 165° C., and the concentration of hydrogen in the discharged gas was 20%. Because the hydrogen concentration in the hydrogenation gas feed was low, the conversion in the first column was 81.3% which was relatively low. However, the hydrogenation reaction was effectively completed in the second column. Benzene concentration in the cyclohexane product was only 14 p.p.m. and again no-by product impurities were detected.

EXAMPLE 5

Same as Example 1 but the reaction was carried out with the catalytic activity controlled in a section from the entrance of the first reaction column to one meter from said entrance with a diluting agent (an inert filler) so that the ratio of the catalyst to filler was 40% (relative activity 0.4) in apparent volume. With the temperature of the jacket elevated to 120° C., the highest temperature inside the initial catalyst reaction layer was still only 215° C. Thus the controlled reactivity catalyst layer makes it possible to raise the temperature of the jacket of the reaction tube and the bed generally by 30° C. as compared with the example wherein control of the catalytic activity was not utilized.

In addition, the cyclohexane product has a purity better than that obtained in Example 1.

COMPARATIVE EXAMPLE 1

In a process such as that described in Example 1, the gas circulation ratio was reduced to 5. As a result, the highest temperature inside the first reaction column reached 280° C. and 99.8% of the benzene feed was converted. However, impurities in the product, even after distillation, amounted to 1.3%. Further, this cyclohexane containing large amounts of impurities was found to be unsuitable for photonitrosation in that it lowered the yield of lactam.

COMPARATIVE EXAMPLE 2

In the process of Example 1, the gas circulation ratio was raised to 90. At this circulation ratio the highest temperature inside the first reaction column was 145° C. and 78% of the benzene was converted. Apart from this unacceptably low yield, as compared with Example 1, the pressure drop through reactors increased remarkably, thus making long term operation impractical.

EXAMPLE 6

Two series-connected, jacketed reaction columns, each having an internal diameter of 38.4 mm. and a catalyst bed length of 2.5 meters, were filled with a pelletized catalyst for hydrogenation. Under the reaction pressure of 30 kg./cm.$^2$, hydrogenation gas (90% hydrogen, remainder nitrogen) was supplied to the system at a rate of 14.1 Nm.$^3$/hr. Benzene was supplied at a rate of 16.6 liters/hour (molar ratio of hydrogen to benzene was 3.04). The gas circulation ratio was 61 (accordingly, the amount of the circulating gas entering the first reaction column was 98 Nm.$^3$/hr.). The jacket of the first reaction column was maintained at 140° C., while that of the second column was maintained at 180° C.

In the catalyst layer from 0.45–1.43 m. from the entrance of the first column, controlled catalytic activity was effected by the inclusion of ceramic particles having a particle size roughly the same as that of the catalyst particles in a sufficient quantity to reduce the relative activity to 0.5. Over-all in the first column, 2.31 kilograms of catalyst ($p_p$=1.55 g./cc.) were used, of which 0.40 kilogram was in the reduced activity layer. The quantity of ceramic particles used was 0.7 kilogram ($p'_p$=2.70 g./cc.).

For comparison, a similar test was conducted without the reduced activity catalyst layer in the first column. The reduction of impurities in the cyclohexane products are shown in the results of these tests tabulated in Table 1. Cyclohexane obtained in the example, with the catalyst layer of reduced activity, had a purity of 99.99% and when used in a photonitrosation reaction with NOCl, cyclohexanone oxime hydrochloride was obtained in good yield.

EXAMPLE 7

Under conditions like those of Example 6, controlled catalytic activity was effected by the use of particulate copper material instead of the ceramic particles. The highest temperature in the catalyst reaction layer in the first column was 190° C. Unreacted benzene accounted for 1.40% of the product material. In this respect and in the quality of the cyclohexane product generally, the results of this test were very similar to those obtained in Example 6.

EXAMPLE 8

Powder of a nickel-type catalyst on a silica carrier was mixed with silica powder of about the same particle size in a catalyst to powder weight ratio of about 1:3. This mixed powder was pelletized, to make a material similar in physical properties, such as apparent density (1.55 g./cc.), to that of ordinary pelletized catalyst powder. The apparent conversion rate of the mixed powder pellets was measured and found to be about one half that of ordinary pelleted catalyst. This is consistent with the value calculated from the relative activity equation.

With the process conditions as set in Example 6, this reduced activity catalyst was used in a section 0.45–1.43 meters from the entrance of the first reaction column tube. As a result, the highest temperature inside the catalyst reaction layer was 195° C., the unreacted benzene was 1.41% and the results were otherwise very similar to those obtained in Example 6. The quality of the cyclohexane product in this example after the completion of the reaction and distillation was also very good.

EXAMPLE 9

In a jacketed reaction column having an internal diameter of 49.5 mm. and a catalyst bed length of 3 meters, about 3.5 liters of the catalyst used in Example 6 was diluted from the entrance to 2 meters therefrom with Raschig rings having a particle size about the same as that of the catalyst particles so that the relative activity in that section was 0.4. With conditions otherwise similar to those in Example 6, 17.1 liters/hour of benzene were supplied to the reaction column, and 13.2 Nm.$^3$/hr. of a hydrogenation gas (hydrogen concentration, 81%, remainder methane) was similarly supplied so that the molar ratio of hydrogen to benzene was 3.08, under a reaction pressure of 30 kg./cm.$^2$ and at a gas circulation ratio of 14, the hydrogenation reaction was carried out as in Example 6. With the temperature in the jacket kept at 160° C., the highest temperature inside the catalyst layer was 210° C., which was within the permissible range. The amount of unreacted benzene at the exit of the reaction column was 1.3%. The quality of cyclohexane obtained when this reaction was completed and the product distilled was good, the cyclohexane having a purity of 99.95%.

EXAMPLE 10

As in Example 9, catalytic activity was controlled in this example by Raschig rings. In this example, however, the relative activity was reduced to 0.4 in a section 0.3–0.6 meter from the entrance of the reaction column and to 0.7 in a section 0.6–1.4 meters from the entrance. The highest temperature inside the catalyst layer was 218° C., which was within the permissible range. The amount of unreacted benzene at the exit of the reaction column was 0.7%. The quality of cyclohexane obtained by the finishing reaction and distillation of this product was good, having a purity of 99.94%.

EXAMPLE 11

Two series-connected reaction columns, each filled with 5 liters of a reduced nickel-type hydrogenation catalyst, were fed Nm.$^3$/hr. hydrogenation gas (hydrogen concentration, 70%, remainder methane) at the reaction pressure of 30 kg./cm.$^2$, and 9 liters/hour of benzene (molar ratio of hydrogen to benzene, 3.08). The amount of circulating gas flowing into the first reaction column was 37 Nm.³/hr. (gas circulation ratio: 10.6).

At the outset of the reaction, the conversion at the exit of the first reaction column was 98%. When under the same conditions, the operation was continued for 4 months, the conversion at the exit of the first reaction column became 90%. The conversion of benzene at the exit of the second reaction column was always above 99.9%. At the outset of the reaction, benzene was added to the hydrogenation gas discharge stream at a rate of 99 cc./hr. As the catalytic activity in the first column deteriorated, this rate was decreased so that the concentration of cyclohexane in the condensate from the discharge gas cooler-separator was maintained at 90 mole percent. This permitted the cooler temperature to be held at −12° C. without freezing thereby improving cyclohexane recovery. In this way loss of cyclohexane in the discharge gas was held below 1 kg.·cyclohexane/metric ton·cyclohexane product, which loss is negligibly small. By way of comparison, if benzene is not added to the discharge gas, cyclohexane freezes and closes down the system when the discharge gas cooler temperature gets as low as 4° C. The process was carried out without benzene addition and with discharge gas cooler temperature at 8° C. The loss of cyclohexane in this comparative example increased 300%, however, to 3 kg./metric ton product.

TABLE 1
(See Example 6)

| | Weight, parts per million | | |
|---|---|---|---|
| | Feed benzene | Product, cyclohexane | |
| | | No control of catalytic activity | Controlled catalytic activity, Example 6 |
| C₄ | 0 | 127 | 0 |
| iso-Pentane | 0 | 23 | 0 |
| n-Pentane | 0 | 176 | 0 |
| 2-methyl-pentane | 9 | 262 | 12 |
| Cyclo-pentane 3-methyl-pentane | 4 | 58 | 0 |
| n-Hexane | 1 | 280 | 0 |
| Methyl-cyclo-pentane | 2 | 251 | 19 |
| Benzene | ¹ 99.991 | 50 | 50 |
| Cyclohexane | 0 | ¹ 99.615 | ¹ 99.990 |
| n-Heptane | 2 | 0 | 0 |
| Methyl-cyclo-hexane | 0 | 63 | 40 |
| Toluene | 71 | 0 | 30 |

¹ Weight percent.

What is claimed is:

1. The process for the preparation of high purity cyclohexane which comprises the steps of
    (a) introducing a feed of a high purity benzene to a first column of a reaction system consisting of at least 2 columns connected in series, each filled with a solid catalyst for hydrogenating benzene with a hydrogenation gas.
    (b) introducing a feed of a hydrogenation gas which includes at least 50% hydrogen into the last of said columns in an amount such that the mol ratio of the hydrogen to the benzene feed is 3–3.8:1.
    (c) advancing said feed of benzene in series from said first of said columns to last of said columns, maintaining the temperature within the said first column at a temperature of 165–220° C. while simultaneously circulating in series said feed of said hydrogenation gas through said reaction system from said last of said columns to said first of said columns and back to said last of said columns, discharging a portion of the hydrogenation gas after passage through the first column from the reaction system in an amount such that the ratio of the amount of the hydrogenation gas circulating in the reaction system to the amount discharged is maintained at 6–80:1 and
    (d) recovering the high purity cyclohexane from said last of said columns
whereby a substantial portion of the benzene feed as it is advanced through said first column is hydrogenated by the hydrogenation gas which has been partially dehydrogenated before reaching said first column and whereby said hydrogenation of said benzene feed is substantially completed in the last of said columns by freshly introduced hydrogenation gas.

2. The process according to claim 1 wherein said column is an external heat-exchange type reactor.

3. The process according to claim 1 wherein the catalyst in a catalyst layer within the first ⅔ of the effective catalyst bed length, beginning at the feed entrance to the reactor, is diluted by an inert substance, the beginning of said layer being in the first ⅓ of said length, the effective length of said layer being at least ⅒ of the effective catalyst bed length and the relative activity of said layer being in the range of 0.3–0.9 as compared to an undiluted catalyst layer.

4. The process according to claim 1 wherein benzene is added to said hydrogenation gas discharge stream to permit recovery of cyclohexane gas therefrom at temperatures below the freezing point of cyclohexane.

References Cited
UNITED STATES PATENTS 3,426,088  2/1969  Proctor _____ 260—667
3,253,048  5/1966  Cabbage _____ 260—667

DELBERT E. GANTZ, Primary Examiner
V. O'KEEFE, Assistant Examiner